(12) United States Patent
Ishii et al.

(10) Patent No.: US 7,590,289 B2
(45) Date of Patent: Sep. 15, 2009

(54) METHOD, APPARATUS, AND PROGRAM FOR IMAGE PROCESSING CAPABLE OF PREVENTING AND DETECTING TAMPERING, AND A MEDIUM STORING THE PROGRAM

(75) Inventors: Masaki Ishii, Kanagawa-ken (JP); Yasushi Abe, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 655 days.

(21) Appl. No.: 10/865,789

(22) Filed: Jun. 14, 2004

(65) Prior Publication Data

US 2004/0258276 A1    Dec. 23, 2004

(30) Foreign Application Priority Data

Jun. 19, 2003    (JP)    ............... 2003-174788

(51) Int. Cl.
  *G06K 9/62*    (2006.01)
  *G06K 9/00*    (2006.01)
  *G09C 3/08*    (2006.01)
(52) U.S. Cl. ............... 382/209; 382/137; 380/51
(58) Field of Classification Search ............... 382/209
  See application file for complete search history.

(56) References Cited

U.S. PATENT DOCUMENTS

| | | | | |
|---|---|---|---|---|
| 5,119,444 A | * | 6/1992 | Nishihara | 382/263 |
| 5,638,188 A | * | 6/1997 | Moro et al. | 358/3.03 |
| 5,724,364 A | * | 3/1998 | Mori et al. | 714/709 |
| 5,866,895 A | * | 2/1999 | Fukuda et al. | 235/494 |
| 5,896,403 A | * | 4/1999 | Nagasaki et al. | 714/752 |
| 5,898,166 A | * | 4/1999 | Fukuda et al. | 235/494 |
| 5,943,448 A | * | 8/1999 | Tatsuta | 382/270 |
| 5,950,181 A | * | 9/1999 | Federl | 706/15 |
| 5,983,243 A | * | 11/1999 | Heiney et al. | 715/500 |
| 6,014,500 A | * | 1/2000 | Wang | 358/1.9 |
| 6,052,813 A | * | 4/2000 | Nagasaki et al. | 714/752 |
| 6,058,225 A | * | 5/2000 | Mori et al. | 382/321 |
| 6,072,871 A | * | 6/2000 | Ur | 380/51 |

(Continued)

FOREIGN PATENT DOCUMENTS

JP    06-113117    4/1994

(Continued)

OTHER PUBLICATIONS

Japanese Office Action: Dispatch No. 389546 issued by the JPO for the corresponding Japanese patent application No. 2003-174788.

(Continued)

*Primary Examiner*—Bhavesh M Mehta
*Assistant Examiner*—David P Rashid
(74) *Attorney, Agent, or Firm*—Dickstein Shapiro LLP

(57) ABSTRACT

A method, apparatus, and program for image processing are provided to perform operations of generating a verification document image and detecting tampering on the verification document image. The verification document image is generated by a document image generator, which adds a verification pattern to an original document image received from a document provider. A tampering detector determines whether the verification document image has been tampered based on the verification pattern. The output unit prints out, under control of a controller, the verification document image as well as information on whether tampering is detected. The above operations are performed on a network, such as the Internet.

15 Claims, 22 Drawing Sheets

U.S. PATENT DOCUMENTS

| | | | |
|---|---|---|---|
| 6,119,937 A * | 9/2000 | Wang et al. | 235/454 |
| 6,148,429 A * | 11/2000 | Tatsuta | 714/763 |
| 6,186,405 B1 * | 2/2001 | Yoshioka | 235/494 |
| 6,192,166 B1 * | 2/2001 | Mori et al. | 382/312 |
| 6,208,771 B1 * | 3/2001 | Jared et al. | 382/306 |
| 6,219,460 B1 * | 4/2001 | Tatsuta | 382/270 |
| 6,289,121 B1 | 9/2001 | Abe et al. | |
| 6,353,840 B2 | 3/2002 | Saito et al. | |
| 6,354,630 B1 * | 3/2002 | Zhang et al. | 283/70 |
| 6,364,209 B1 * | 4/2002 | Tatsuta et al. | 235/494 |
| 6,384,935 B1 * | 5/2002 | Yamazaki | 358/1.9 |
| 6,421,145 B1 | 7/2002 | Kurita et al. | |
| 6,445,465 B1 * | 9/2002 | Samworth | 358/1.9 |
| 6,580,804 B1 | 6/2003 | Saito et al. | |
| 6,633,526 B1 * | 10/2003 | Imade et al. | 369/59.1 |
| 6,707,577 B1 * | 3/2004 | Morikawa et al. | 358/3.03 |
| 6,741,722 B2 | 5/2004 | Abe | |
| 7,039,215 B2 | 5/2006 | Suzaki | |
| 7,057,775 B2 | 6/2006 | Kurita et al. | |
| 7,061,652 B2 | 6/2006 | Kurita et al. | |
| 7,085,399 B2 | 8/2006 | Suzaki | |
| 2001/0002827 A1 * | 6/2001 | Yamazaki et al. | 345/82 |
| 2002/0040816 A1 * | 4/2002 | Sahlberg et al. | 178/18.01 |
| 2002/0097903 A1 * | 7/2002 | Prakash | 382/137 |
| 2004/0090646 A1 | 5/2004 | Saitoh et al. | |

FOREIGN PATENT DOCUMENTS

| | | |
|---|---|---|
| JP | 8-297743 | 11/1996 |
| JP | 11-98344 | 4/1999 |
| JP | 11-112787 | 4/1999 |
| JP | 11-275511 | 10/1999 |
| JP | 2002-044429 | 2/2002 |
| JP | 2002-99209 | 4/2002 |
| JP | 2002-209085 | 7/2002 |
| JP | 2002-298120 | 10/2002 |
| JP | 2003-066839 | 3/2003 |
| JP | 2003-101762 | 4/2003 |

OTHER PUBLICATIONS

Japanese Office Action: Dispatch No. 608219 issued by the JPO for the corresponding Japanese patent application No. 2003-174788.
Japanese Office Action: Dispatch No. 449010 issued by the JPO for the corresponding Japanese patent application No. 2003-174788.

* cited by examiner

FIG. 3

Receipt

Payee Name : XXX    Payer Name : Ricoh Co., Ltd

Date : December 9, 2002

Description

Total                                               $1,000-

FIG. 4

Receipt

Payee Name : XXX    Payer Name : Ricoh Co., Ltd

Date : December 9, 2002

Description

Total                                               $1,000-

FIG. 10

```
                              Receipt

Payee Name : XXX        Payer Name : Ricoh Co., Ltd

Date : December 9, 2002

Description

Total                                         $1,000=
```

FIG. 14

TEST NO. : 7890
DOCUMENT NO. : 123456
PREPARED BY : ○ ○ ○ ○
TEST DATE : OCTOBER 25, 2002
RESULT : TAMPERING DETECTED
TAMPERED PART : K:04

FIG. 15

DOCUMENT NO. : 123456
PREPARED BY : ○ ○ ○ ○
TEST DATE : OCTOBER 25, 2002
RESULT : TAMPERING DETECTED
TAMPERED PART : K:04

A B C D E F G H I J K L M N O P Q R S T U V W X Y Z 01
02
03
04
05
06
07
08
09
10

Receipt

Payee Name: XXX        Payer Name: Ricoh Co., Ltd

Date: December 9, 2002

Description

Total                                          $1,000–

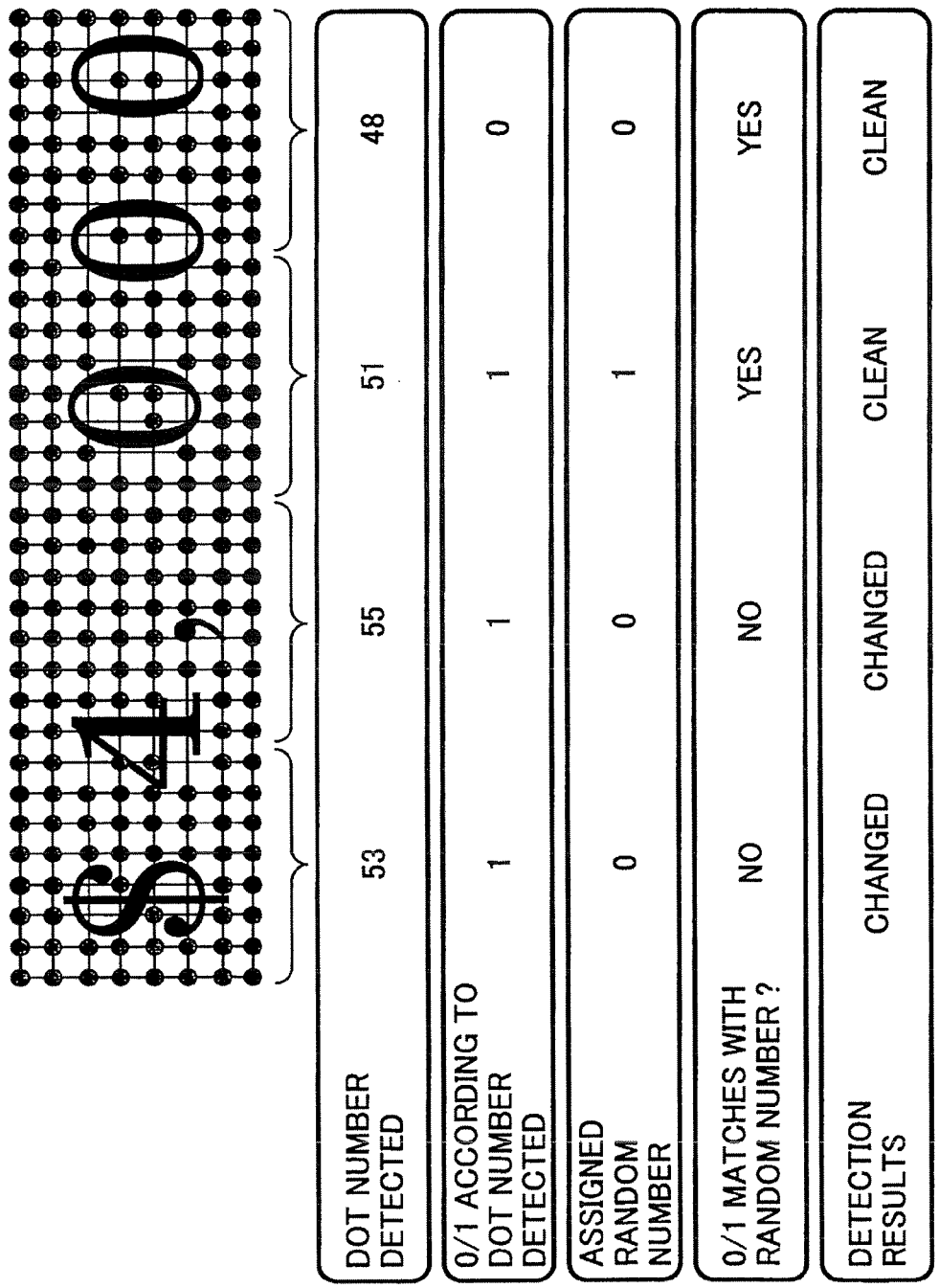

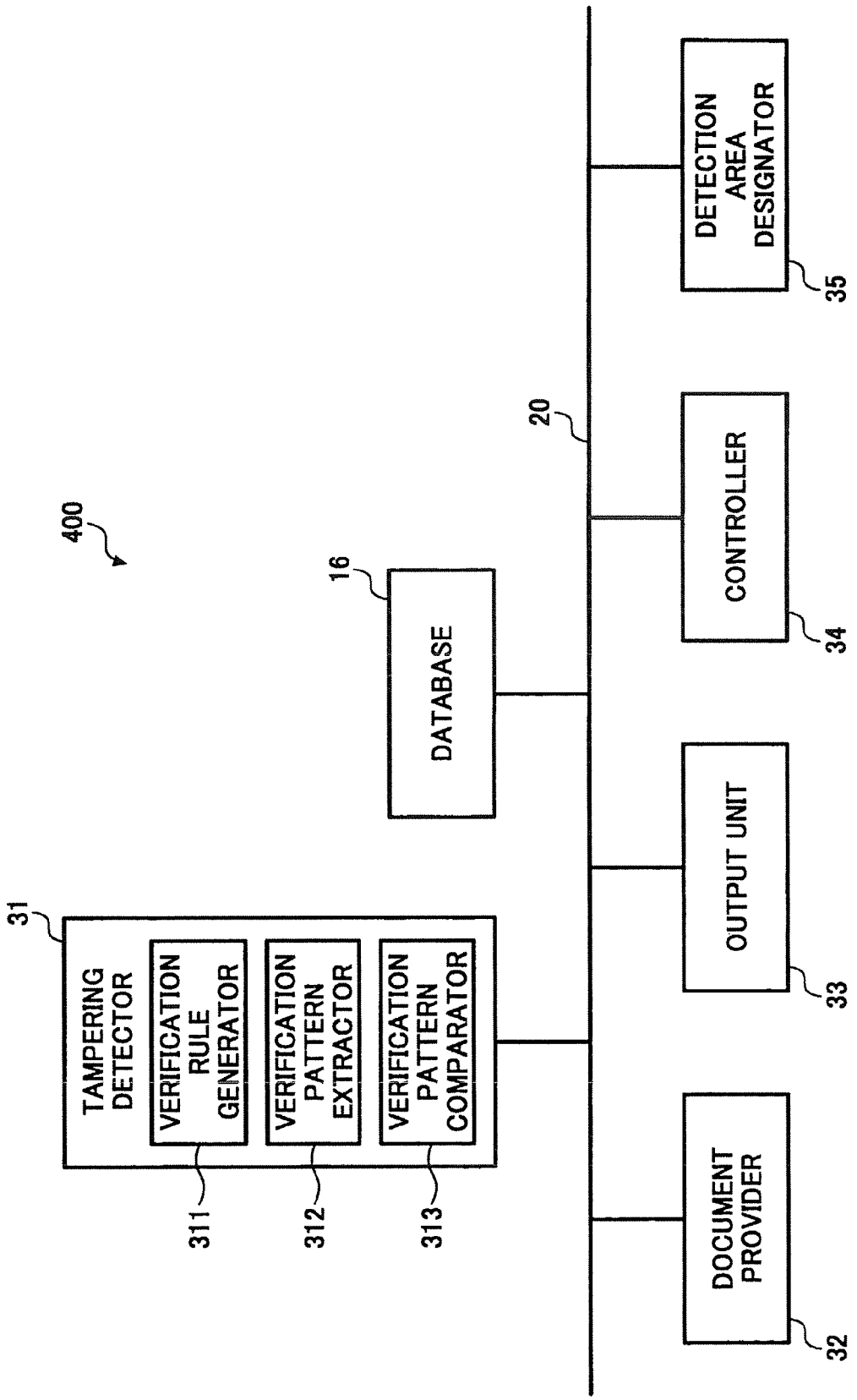

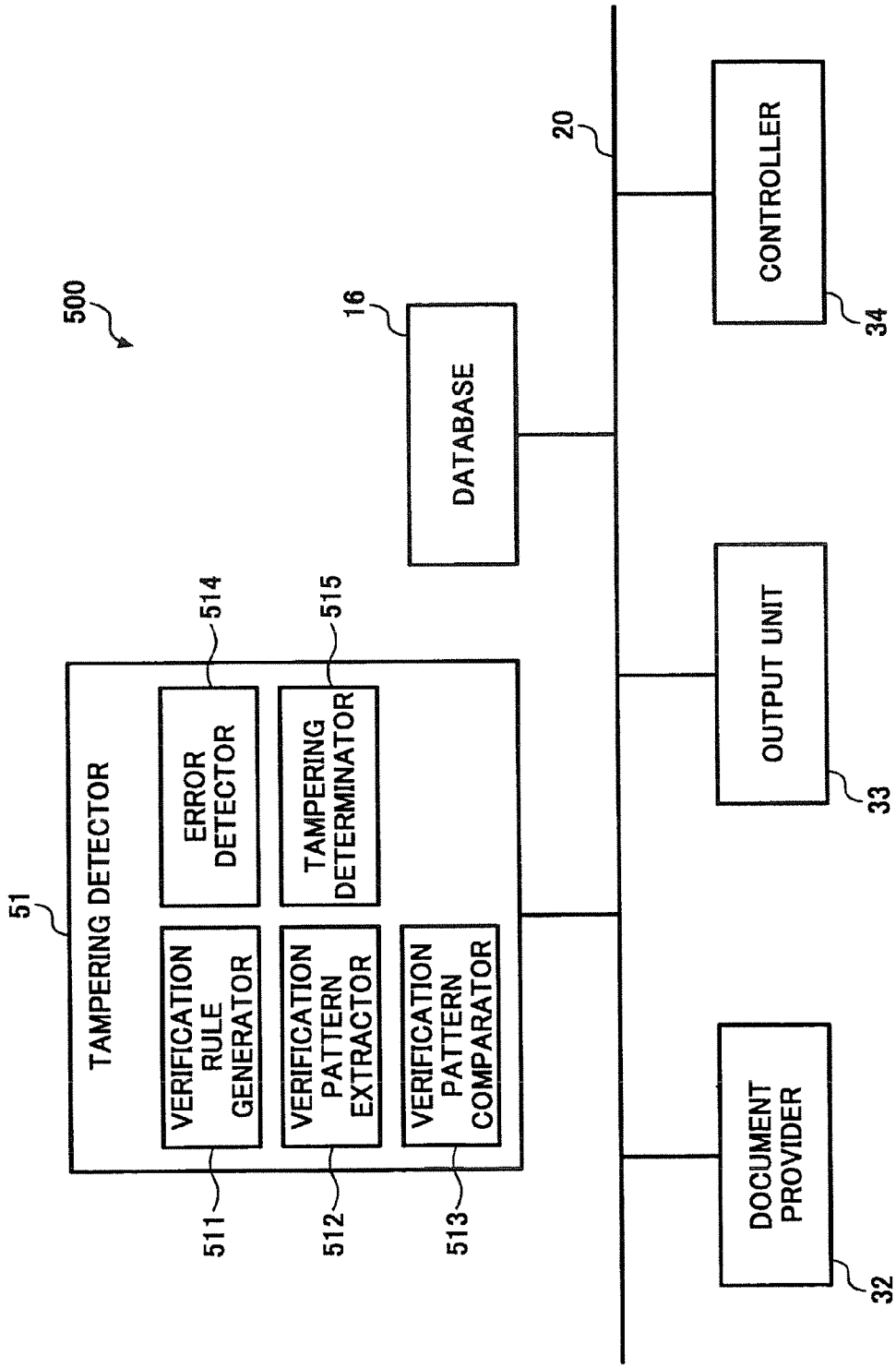

METHOD, APPARATUS, AND PROGRAM FOR IMAGE PROCESSING CAPABLE OF PREVENTING AND DETECTING TAMPERING, AND A MEDIUM STORING THE PROGRAM

CROSS-REFERENCE TO RELATED APPLICATIONS

The present invention claims priority to Japanese patent application No. JPAP2003-174788 filed on Jun. 19, 2003, in the Japanese Patent Office, the entire contents of which are incorporated by reference herein.

FIELD OF THE INVENTION

The present invention relates to a technique of detecting fraudulent alteration of a digital image or a printed material, and more particularly to a method, apparatus, and program for image processing, capable of preventing and detecting fraudulent alteration of the digital image or the printed material.

BACKGROUND OF THE INVENTION

With recent improvements in image processing and image forming technologies, it has become possible to easily alter an original image. For this reason, numerous techniques for ensuring the validity of an original image have been developed.

However, many of such techniques are not applicable or not effective when the original image is provided in the form of a paper document, such as a paper currency, or provided via a network, such as the Internet.

BRIEF SUMMARY OF THE INVENTION

The present invention provides an apparatus, method, and related computer program product or medium, capable of preventing and detecting alteration of an original image or an original printed material, especially when such an image or material is provided via a network.

In one exemplary embodiment, an image processing apparatus includes a document image generator and an image processor, connected to each other via a network, such as the Internet. The document image generator generates a verification document image by adding a specific verification pattern to an original document image. The original document image may be provided by an image provider of the image processor. The image processing apparatus may additionally include a database storing a plurality of verification patterns, including the specific verification pattern added to the original document image. Further, a printer of the image processor may print out the verification document image, under control of a controller of the image processor.

Further, the image processing apparatus may include a verification area designator configured to designate a verification area, to which the specific verification pattern is added. With the absence of a verification area designator, the document image generator adds the specific verification pattern to an entire portion of the original document image.

Furthermore, the specific verification pattern may include a plurality of predetermined verification pattern elements. The document image generator may adjust a number of the plurality of predetermined verification pattern elements, according to a predetermined arrangement, before generating the verification document image. The predetermined arrangement may be determined based on a random number sequence, preferably generated from a random number generator.

In another exemplary embodiment, an image processing apparatus includes a tampering detector and an image processor, connected to each other via a network, such as the Internet. The tampering detector detects tampering, if any, on a verification document image based on a verification pattern extracted from the verification document image. The verification document image may be provided by an image provider of the image processor. Further, before performing tamper detection, the tampering detector first determines whether the extracted verification pattern is included in a database of the image processing apparatus, and starts tamper detection only when the extracted verification pattern is included. After performing tamper detection, the detection result may be output by an output unit of the image processor, under control of the controller of the image processor, for example.

Further, the image processing apparatus may be provided with a detection area designator configured to designate a detection area, on which the tampering detector performs tamper detection. With the absence of a detection area designator, the tampering detector performs a tamper detection process on the entire portion of the verification document image.

Furthermore, the image processing apparatus may include an error detector and a tampering determinator. The error detector stores the detection result obtained by the tampering detector. The tampering determinator determines whether the verification document image has been tampered based on the detection result stored in the error detector.

The image processing apparatus of the present invention is not limited to the above-described embodiments, as illustrated in the following description. Further, the present invention may be implemented as a method, a system, a computer program product, and a computer readable medium, without departing from the scope and spirit of the appended claims.

BRIEF DESCRIPTION OF THE DRAWINGS

A more complete appreciation of the disclosure and many of the attendant advantages thereof will be readily obtained as the same become better understood by reference to the following detailed description when considered in connection with the accompanying drawings, wherein:

FIG. 3 is an exemplary document image to be processed by the image processing apparatus of FIG. 1;

FIG. 4 is an exemplary document image generated by the image processing apparatus shown in FIG. 1;

FIG. 10 is an exemplary document image generated by the image processing apparatus shown in FIG. 9;

FIG. 14 is an exemplary output of the image processing apparatus shown in FIG. 12;

FIG. 15 is another exemplary output of the image processing apparatus shown in FIG. 12;

FIG. 17 is an exemplary process of tamper detection performed by the image processing apparatus of FIG. 12;

FIG. 18 is a block diagram illustrating an image processing apparatus according to another embodiment of the present invention;

FIG. 20 is a block diagram illustrating an image processing apparatus according to another embodiment of the present invention;

DETAILED DESCRIPTION OF THE INVENTION

Figure 1:
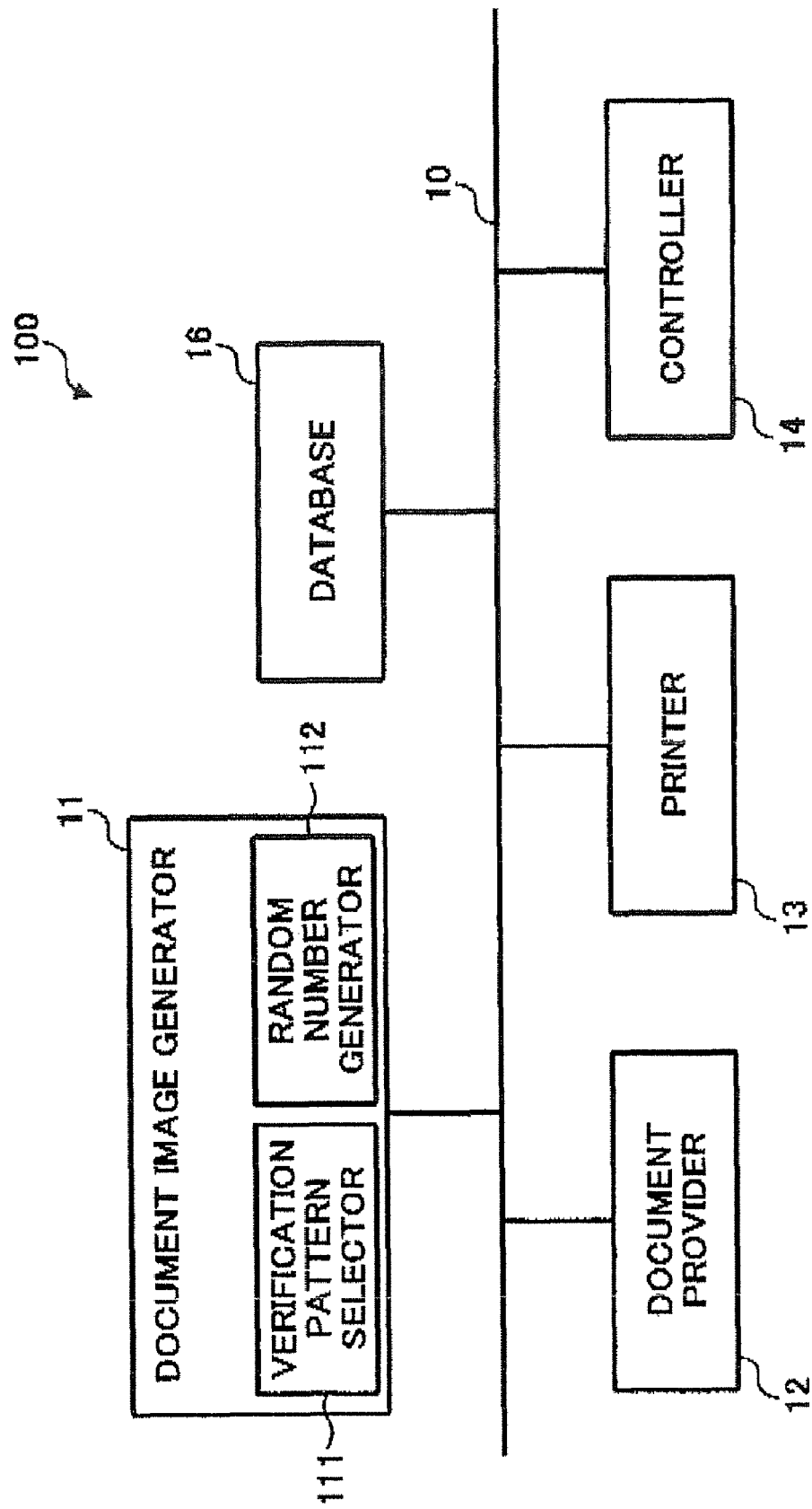
FIG. 1 is a block diagram illustrating an image processing apparatus according to an exemplary embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 1, a description is provided for an image processing apparatus 100 according to a preferred embodiment of the present invention.

The image processing apparatus 100 has a function of adding a verification pattern to an original document image received from the outside, and includes a document image generator 11 provided with a verification pattern selector 111 and a random number generator 112, a document provider 12, a printer 13, a controller 14, and a database 16, which are all connected via a network 10.

The network 10, in this example, is preferably implemented as the Internet, however, any kind of network may be used, including LAN, WAN, CAN, MAN, and HAN, for example. Furthermore, functions of the document provider 12, printer 13, and controller 14, may be integrated into one device.

The document image generator 11 generates a verification document image by adding a verification pattern to an original document image received from the document provider 12. The verification pattern is previously stored in the database 16 and selected by the verification pattern selector 111. The printer 13 prints out the verification document image under control of the controller 14.

Figure 2:
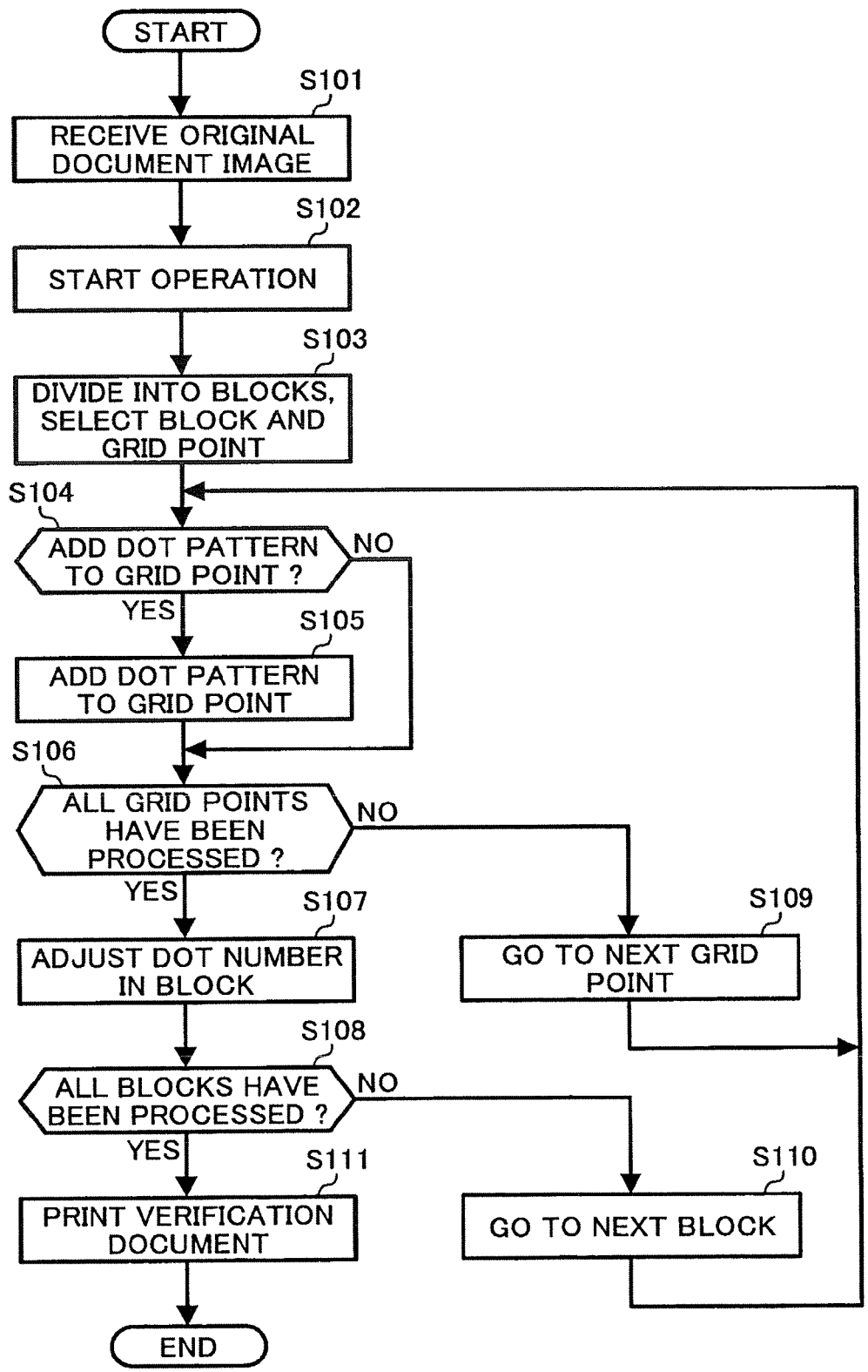
FIG. 2 is a flowchart illustrating an operational process of the image processing apparatus of FIG. 1.

Referring now to the flowchart of FIG. 2, an exemplary operation of the image processing apparatus 100 for generating a verification document image is now explained.

In Step S101, the document image generator 11 receives an original document image from the document provider 12 via the network 10. The document provider 12 may generate an original document image by itself using suitable software, or it may read out from an original document provided from the outside. As for the document provider 12, a facsimile, a scanner, or a computer may be used. Further, an original document image is preferably an image of a monetary document, such as a paper currency, a security, or a check, however, any other confidential document such as a contract may be used. FIG. 3 illustrates an exemplary original image suitably used by the image processing apparatus 100.

Upon receiving the original document image, in Step S102, the image processing apparatus 100 starts operation for generating a verification document image.

Figure 5:
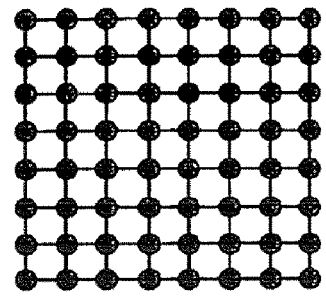
FIG. 5 illustrates an exemplary block containing a plurality of grid points.

In Step S103, the image processing apparatus 100 divides the original document image into a plurality of blocks, with each block containing a plurality of grid points. In this embodiment, the document image of FIG. 4 is divided into a plurality of blocks with each block containing 64 grid points, as illustrated in FIG. 5. Subsequently, the verification pattern selector 111 selects a block to be focused, calculates the positions of the grid points in the selected block, and selects a grid point to be focused.

Then, in Step S104, the verification pattern selector 111 determines whether to add a verification pattern to the selected grid point. In this embodiment, the verification pattern selector 111 determines to add a verification pattern only when no document data exists thereon or in the vicinity thereof, and in Step S105, a verification pattern is added to the selected grid point. When document data exists on or close to the selected grid point, the operation moves to Step S106.

Figure 6:
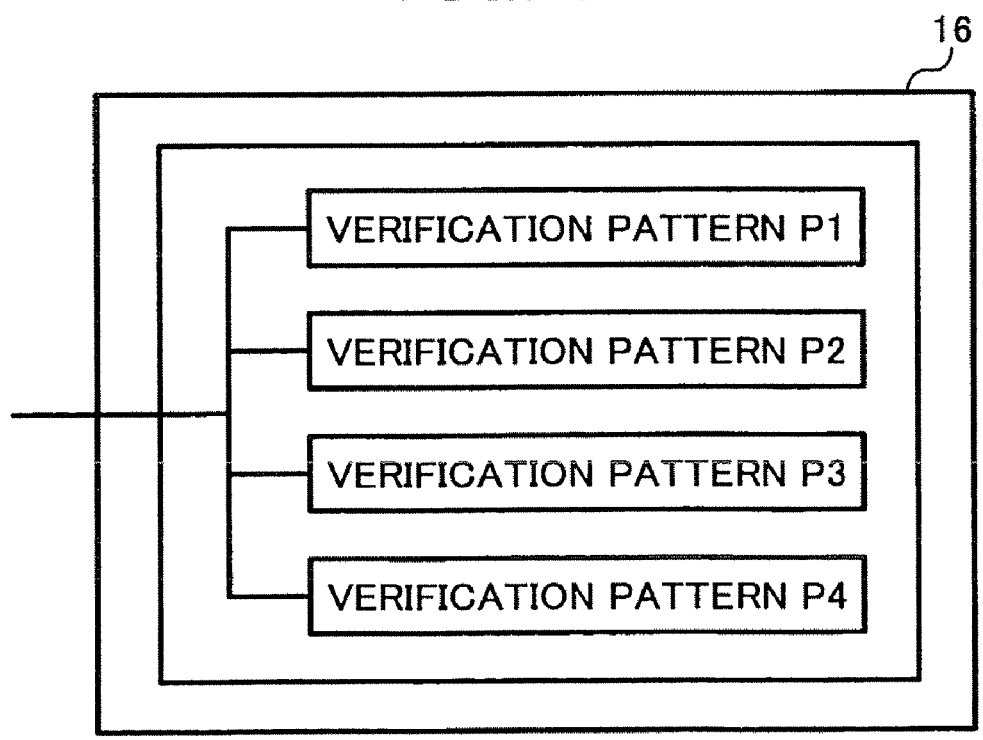
FIG. 6 is an exemplary structure of a database shown in FIG. 1.
Figure 7:
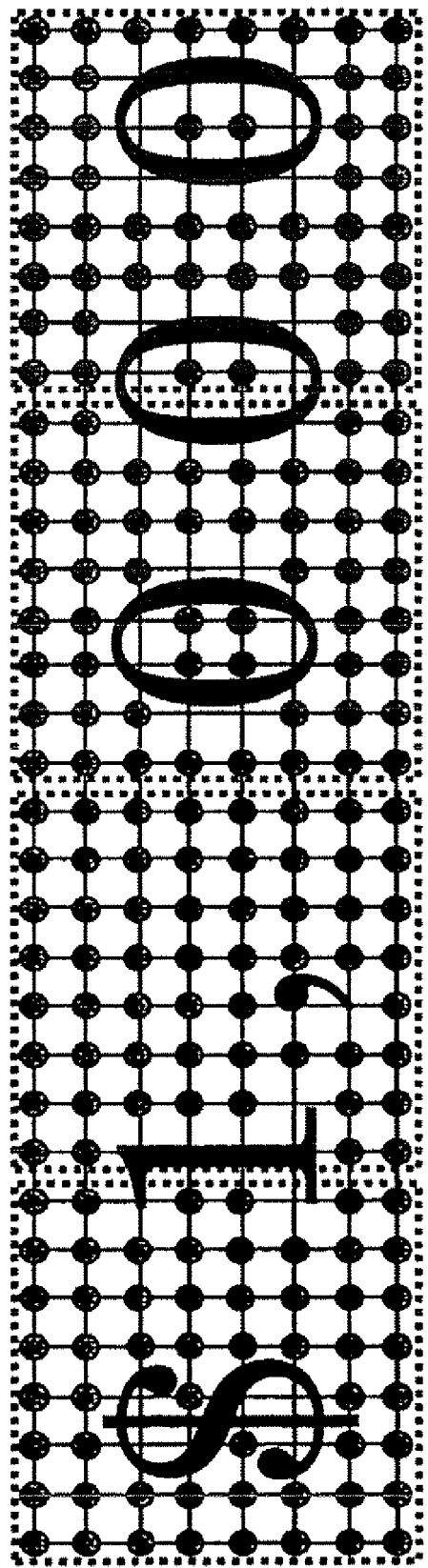
FIG. 7 is a part of the exemplary document image shown in FIG. 4.

In Step S104, the verification pattern selector 111 extracts a desired verification pattern from the database 16 via the network 10. The database 16 stores therein a plurality of verification patterns P1, P2, P3 and P4, for example, as illustrated in FIG. 6. The plurality of verification patterns may include, for example, a dot pattern, a line pattern, and a sequential or non-sequential repetitive pattern. The dot pattern is defined, for example, in terms of the shape, arrangement, density, size, and color of each dot. The line pattern is defined, for example, in terms of the arrangement, density, thickness, and color of each line. The sequential or non-sequential repetitive pattern is defined, for example, in terms of the shape, arrangement, density, size, and color of each sequential or non-sequential pattern. FIG. 7 illustrates a part of the original document image of FIG. 3, with a dot pattern added thereto. In the first block, 56 dots are added to the grid points having no data thereon or close thereto. Similarly, 57, 52, and 48 dots are added to the second block, the third block, and the fourth block, respectively.

Next, Step S106 determines whether all the grid points in the selected block have been processed. When all the grid points have been processed, the operation moves to Step S107. Otherwise, in Step S109, the target moves to a next grid point, and Steps S104 to S106 are repeated.

In Step S107, the image processing apparatus 100 adjusts the amount of verification patterns added in the selected block. For example, in the case of dot pattern, the number of dots added in the selected block (hereinafter, referred to as a "dot number") is adjusted so as to correspond to a random number previously assigned to the selected block. The following explains an exemplary process of adjusting dot numbers in the document image of FIG. 7, with reference to FIG. 8.

Figure 8:
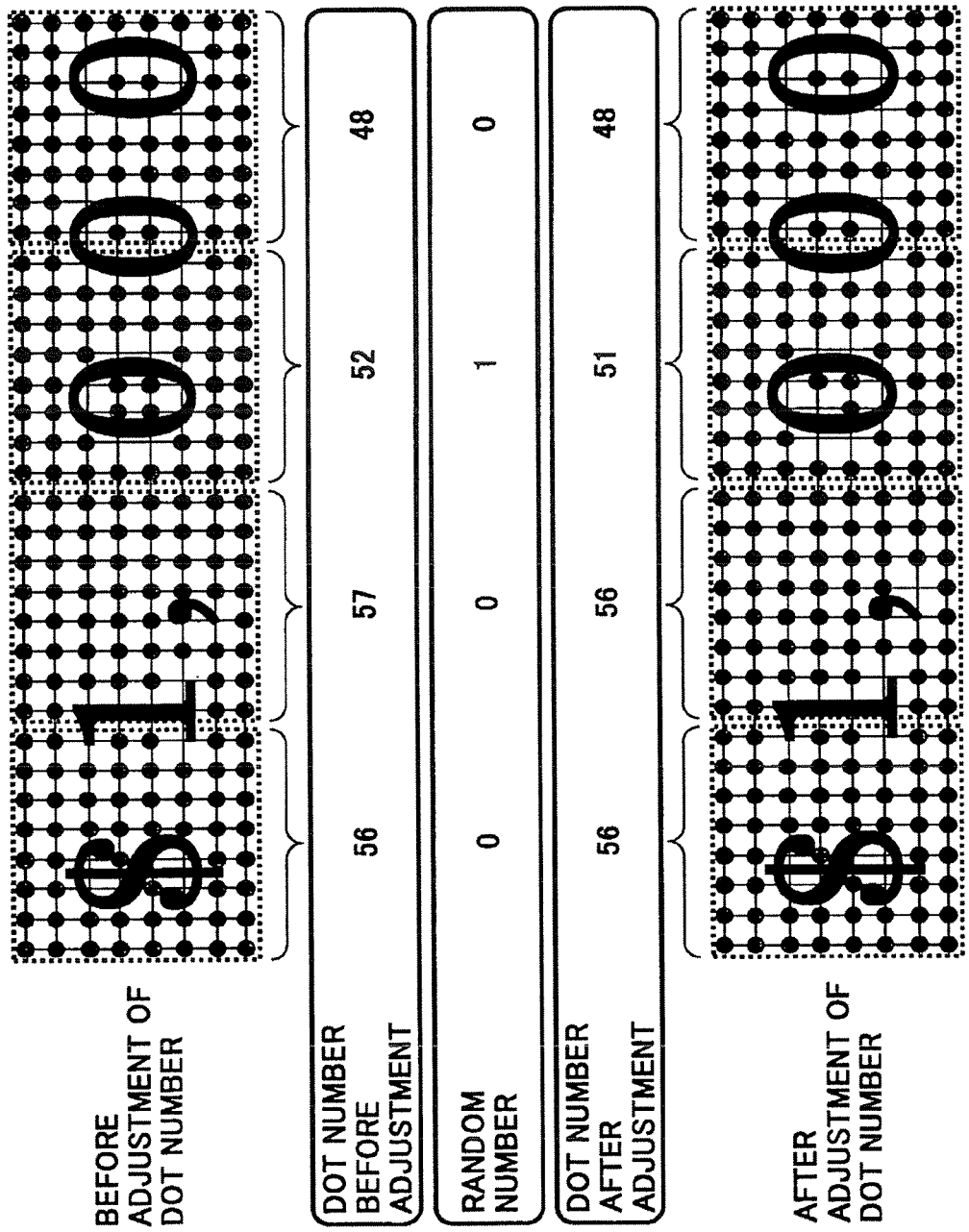
FIG. 8 is an exemplary process of adjusting dot numbers performed by the image processing apparatus of FIG. 1.

In Step S107, the document image generator 11 generates a random number sequence containing 0 and 1 using the random number generator 102, and randomly assigns a random number 0 or 1 to each block. If the number 0 is assigned, and a dot number is an odd number, the dot number is changed to an even number, for example, by deleting one dot. If the number 1 is assigned, and a dot number is an even number, the dot number is changed to an odd number, for example, by deleting one dot. Therefore, if random numbers 0, 0, 1, and 0 are respectively assigned to the first, second, third, and fourth blocks, as shown in FIG. 8, the dot number 57 of the second block and the dot number 52 of the third block are changed to 56 and 51, respectively, while the dot number 56 of the first block and the dot number of 48 of the fourth block remain unchanged.

In Step S107, instead of assigning the random number 0 or 1, the odd or even of a dot number may be previously defined.

Step S108 determines whether all the blocks in the original image have been processed. When all the blocks have been processed, the operation moves to Step S111. Otherwise, in Step S110, the target moves to the next block, and Steps S104 to S108 are repeated.

In Step S111, the controller 14 instructs the printer 13 to print a verification document based on the verification document image received from the document image generator 11. In this embodiment, any kind of hardware or software may be used as the controller 14, while any kind of image forming apparatus, such as a printer, plotter, or copier, may be used as the printer 13. Further, the printer 13 can print the image on a normal type of paper using a normal type of toner or ink. FIG. 4 illustrates an exemplary document image generated based on the exemplary original image of FIG. 3.

In another example, the image processing apparatus 100 may print out an original document image as is without adding a verification pattern thereto. In such a case, a document image generation starter (not shown) is preferably provided for allowing a user to choose to add or not to add a verification pattern. The document provider 12 may also function as the document image generation starter, for example, by receiving an instruction from the controller 14.

Figure 9:
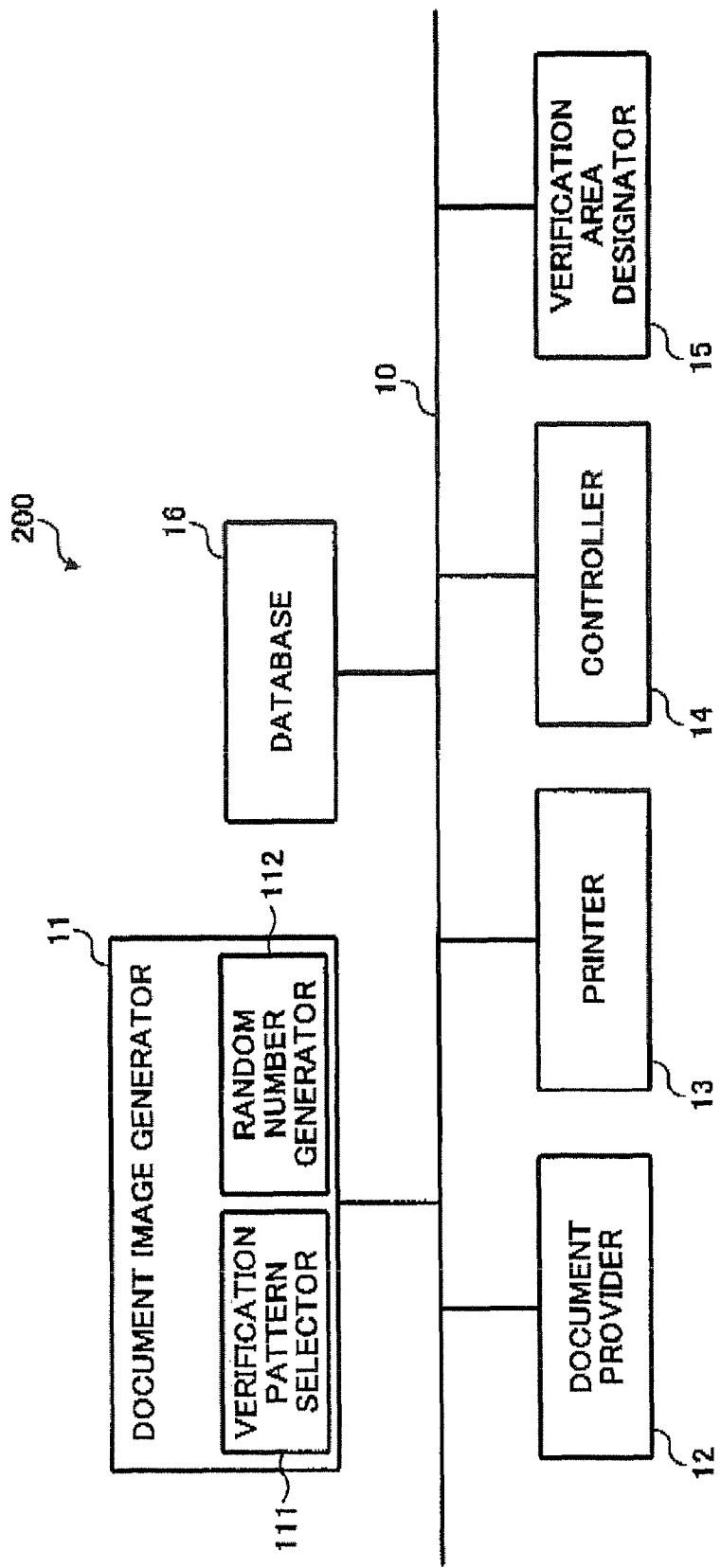
FIG. 9 is a block diagram illustrating an image processing apparatus according to another embodiment of the present invention.

Next, an image processing apparatus 200 according to another embodiment of the present invention will be described referring to FIG. 9. The image processing apparatus 200 is similar to the one shown in FIG. 1, except for a verification area designator 15. The image processing apparatus 200 adds a verification pattern to specific parts of a document image, compared to the case of the image processing apparatus 100, which adds a verification pattern to the entire document image. FIG. 10 illustrates an exemplary document image generated by the image processing apparatus 200 based on the exemplary original image of FIG. 3.

Figure 11:
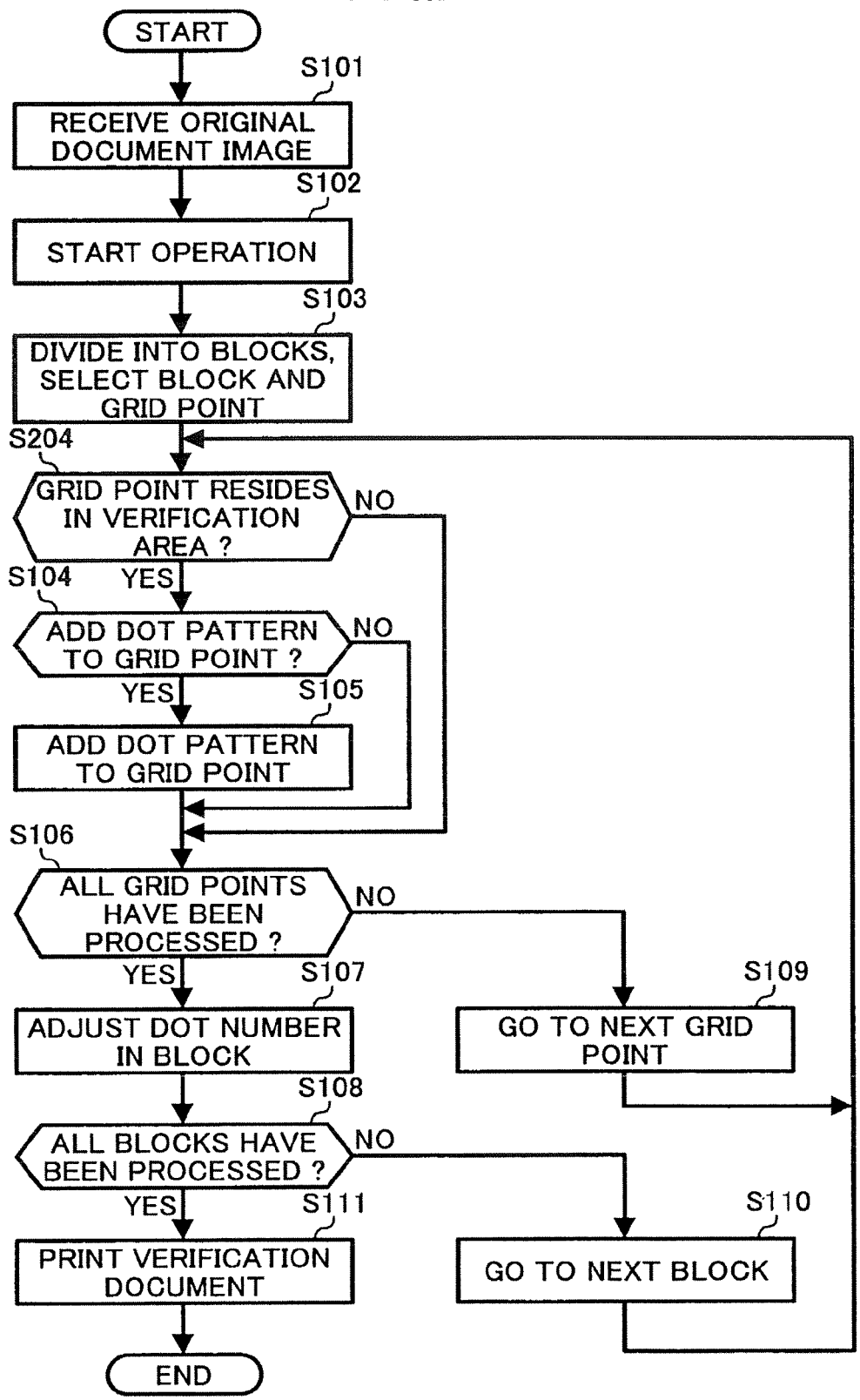
FIG. 11 is a flowchart illustrating an operational process of the image processing apparatus of FIG. 9.

As shown in FIG. 11, the operation of the image processing apparatus 200 is substantially similar to the operation of the image processing apparatus 100 of FIG. 2, except for the additional Step S204. After a grid point is selected in Step S103, in Step S204, the verification area designator 15 determines whether the selected grid point resides in a verification area previously specified. If the selected grid point resides in the verification area, the operation moves to Step S104, otherwise the operation moves to Step S106.

Figure 12:
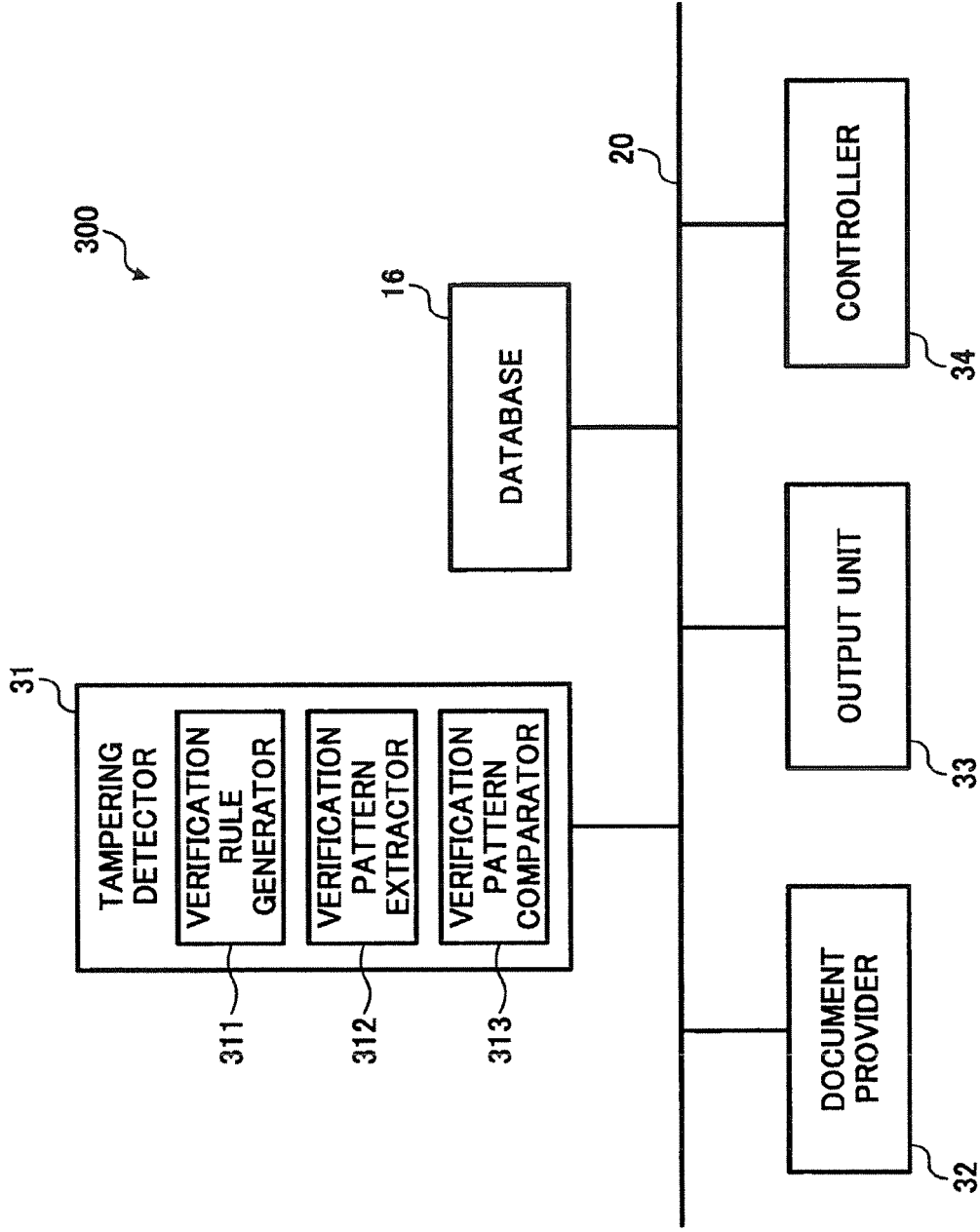
FIG. 12 is a block diagram illustrating an image processing apparatus according to another embodiment of the present invention.

Next, an image processing apparatus 300 according to another embodiment of the present invention will be described referring to FIG. 12.

The image processing apparatus 300 checks validity of a verification document image provided from the outside, and includes a tampering detector 31, a document provider 32, an output unit 33, a controller 34, and a database 16, which are all connected via a network 20.

The document provider 32, the controller 34, and the network 20 are substantially similar to the document provider 12, the controller 14, and the network 10 of FIG. 1, respectively. Further, functions of the document provider 32, output unit 33, and controller 34, may be integrated into one device.

The tampering detector 31 detects tampering, if any, on a verification document image received from the document provider 32, and includes a verification rule generator 311, a verification pattern extractor 312, and a verification pattern comparator 313. The verification rule generator 311 determines whether a verification document image is detectable by the image processing apparatus 300, and generates a verification rule if it is detectable. The verification pattern extractor 312 extracts characteristics of the verification pattern added to the image. The verification pattern comparator 313 compares the extracted characteristics with those of one of the verification patterns previously stored in the database 16, and detects tampering of the verification document image.

Figure 13:
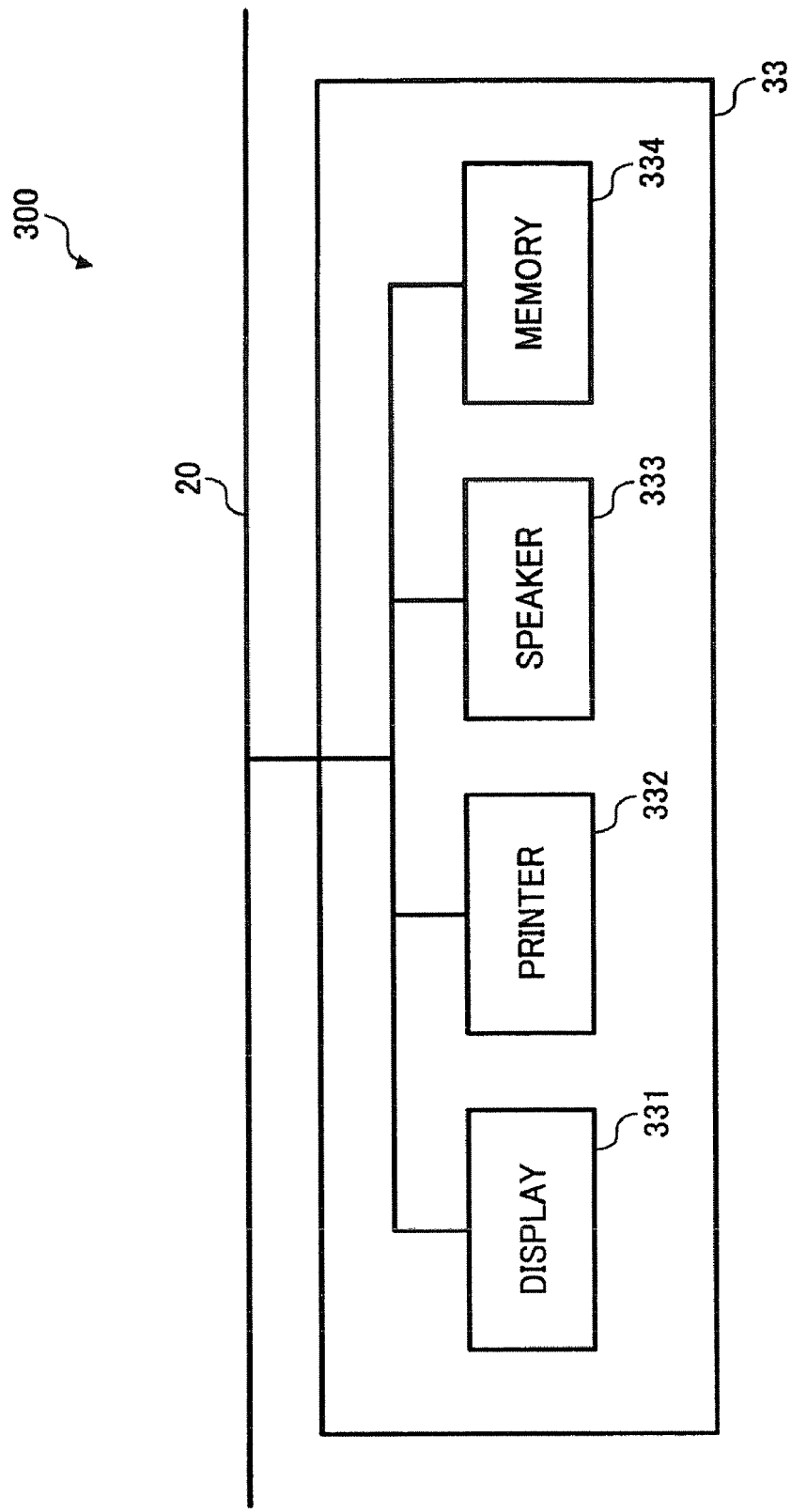
FIG. 13 is a block diagram illustrating an output unit shown in FIG. 12.

The detection result of the tampering detector 31 is output to the output unit 33, which includes a display 331, a printer 332, a speaker 333, and a memory 334, as illustrated in FIG. 13.

The display 331, which may be implemented as any kind of display, such as e.g., a liquid crystal display, displays the detection result to a user. For example, as illustrated in FIG. 14, the display 331 provides the user with various information on a verification document image, including, for example, the number and date of which the validity is checked, the number and preparer of a verification document image, and the detection result of whether tampering is detected, and if detected, a portion of the image being tampered. The display 331 may additionally display the verification image as illustrated in FIG. 15.

The printer 332, which may be implemented as a printer or a plotter, prints out the detection result. For example, the printer 332 prints out the detection result shown in FIG. 14 or FIG. 15.

The speaker 333 outputs a warning sound or voice if tampering is detected, and outputs no sound or voice if tampering is not detected. Alternatively, the speaker 333 may generate a warning sound or voice notifying that tampering is detected, and generate another warning sound or voice notifying that tampering is not detected. As for the speaker 333, any kind of audio or voice output device may be used.

The memory 334 stores therein information whether a verification document image is tampered, and if tampered, the tampered document image as well as various information on the tampered document image. As for the memory 334, any kind of storage medium may be used including floppy disks, optical disks, CD-ROMs, magneto-optical disks, ROMs, RAMs, EPROMs, EEPROMs, flash memory, magnetic or optical cards. Further, the information stored in the memory 334 may be output to another device via the network 20 as needed. For example, the tampering detector 31 may detect tampering on a plurality of verification document images at a time, and store the detection results on the plurality of verification document images in the memory 334. The detection results may be then output to the display 331 or the printer 332, at any desired time.

In this embodiment, the display 331, the printer 332, the speaker 333, and the memory 334 are integrated into one device of the output unit 33, however, these devices may be distributed over the network 20.

Referring now to the flowchart of FIG. 16, an exemplary operation of the image processing apparatus 300 for tamper detection will be explained in more details.

In Step S301, the tampering detector 31 receives a verification document image from the document provider 32 via the network 20.

In Step S302, the verification rule generator 311 determines whether the received document image is detectable. If yes, the operation moves to Step S303, otherwise, the operation ends without performing tamper detection on the document image.

In Step S302, if the verification rule generator 311 is provided with information that the verification pattern has been generated by one of the above or other embodiments of the image processing apparatus of the present invention, the verification rule generator 311 automatically determines if it is detectable, and generates a verification rule based on the provided information. Using this verification rule, the tampering detector 31 divides the image into a plurality of blocks, and the operation moves to Step S303.

When none of such information on the verification document image is provided, the verification rule generator 311 performs pattern matching on the image. For example, the verification rule generator 311 divides the image into a plurality of blocks with each block containing a predetermined number of grid points, arbitrarily selects one of the plurality of blocks, and arbitrarily extracts a verification pattern in the selected block to compare it with respective verification patterns stored in the database 16. If the extracted verification pattern matches one of the verification patterns stored in the database 16, the verification rule generator 311 determines if the image is detectable, generates a verification rule based on the matched verification pattern, and the operation moves to Step S303.

In Step S303, the verification rule generator 311 calculates positions of the grid points in the image.

In Step S304, the verification pattern extractor 312 selects a block to be focused, further selects a grid point to be focused in the selected block, and initializes its counter (not shown) to 0. In Step S305, the verification pattern extractor 312 checks whether a verification pattern has been added to the selected block. If the answer is yes, the operation moves to Step S306 to increment the counter by one, otherwise the operation moves to Step S307.

In Step S307, the image processing apparatus 300 determines whether all the grid points in the selected block have been processed. When all the grid points have been processed, the operation moves to Step S309. Otherwise, in Step S308, the target moves to a next grid point, and Steps S305 to S307 are repeated.

In Step S309, the image processing apparatus 300 determines whether the selected block has been tampered based on the amount of verification patterns added in the selected block. For example, in the case of a dot pattern, it is determined whether an even or odd dot number in the selected block corresponds to a random number 0 or 1, that has been previously assigned to the selected block. If the answer is yes, the operation moves to Step S310 to determine that the selected block has not been tampered, and otherwise, the operation moves to Step S311 to determine that the selected block has been tampered.

Next, Step S312 determines whether all the blocks in the image have been processed. When all the blocks have been processed, the operation moves to Step S314. Otherwise, in Step S313, the target moves to a next block, and Steps S304 to S312 are repeated.

In Step S314, the controller 34 instructs the output unit 33 to output the detection result on all processed blocks.

FIG. 17 illustrates an exemplary process of tamper detection performed by the image processing apparatus 300. In this example, the figure "1" of the image shown in FIG. 7 has been changed to "4". A first block of FIG. 17 has a dot number 53. This assumes that the random number 1 has been originally assigned to the first block. However, a real assigned random number is 0. As a result, the tampering detector determines that the first block has been tampered. Similarly, the tampering detector determines that a second block has been tampered, while a third and fourth blocks have not been tampered.

Next, an image processing apparatus 400 according to another embodiment of the present invention will be described referring to FIG. 18. The image processing apparatus 400 is similar to the one shown in FIG. 12, except for a detection area designator 35. The image processing apparatus 400 detects tampering, if any, on a selected portion of a verification document image, compared to the case of the image processing apparatus 300, which detects tampering on the entire verification document image.

Figure 16:
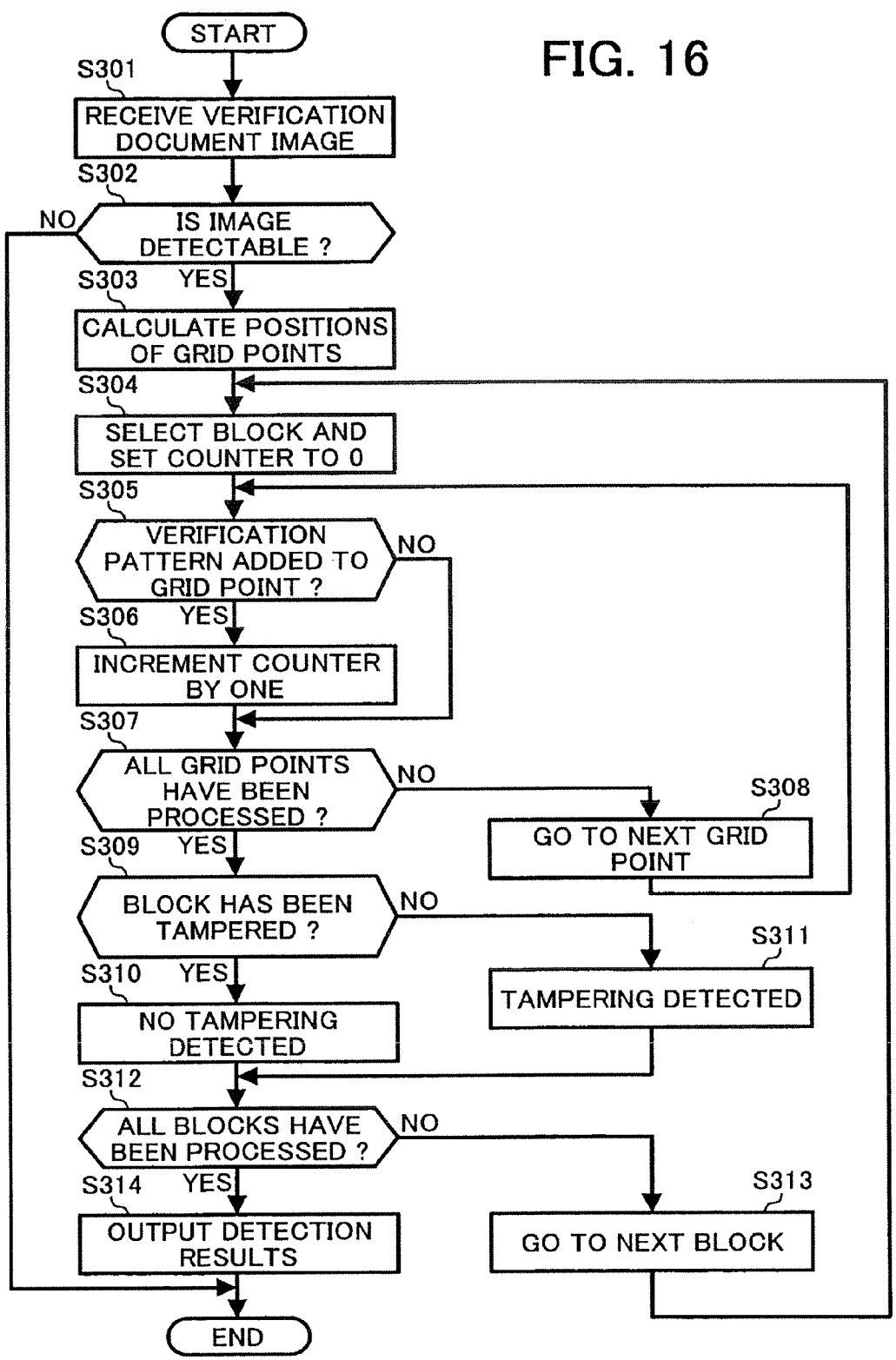
FIG. 16 is a flowchart illustrating an operational process of the image processing apparatus of FIG. 12.
Figure 19A:
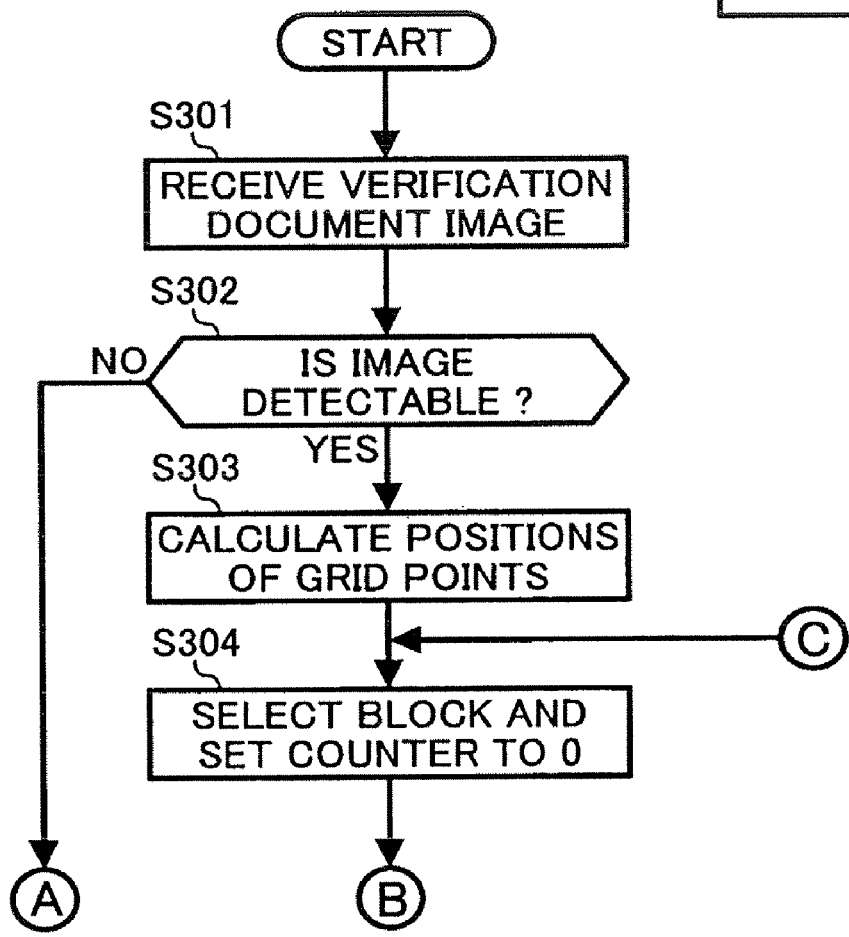
FIG. 19 is a flowchart illustrating an operational process of the image processing apparatus of FIG. 18.
Figure 19B:
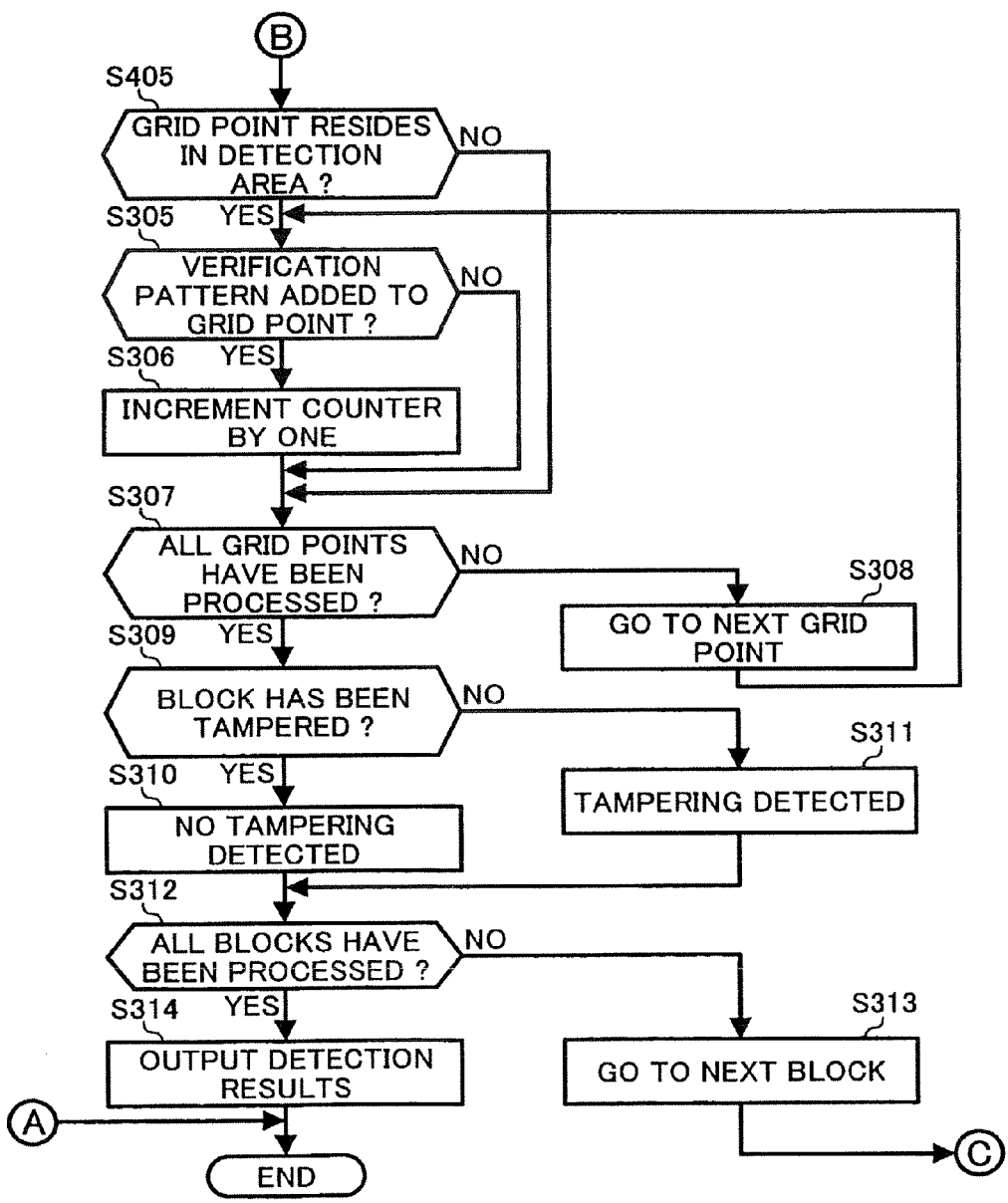

As shown in FIG. 19, the operation of the image processing apparatus 400 is substantially similar to the operation of the image processing apparatus 300 of FIG. 16, except for the additional Step S405. After a grid point is selected in Step S304, in Step S405, the tampering area designator 35 determines whether the selected grid point resides in a detection area previously specified. If the selected grid point resides in the detection area, the operation moves to Step S305, otherwise the operation moves to Step S307.

Next, an image processing apparatus 500 according to another embodiment of the present invention will be described referring to FIG. 20. The image processing apparatus 500 is similar to the one shown in FIG. 12, except that the tampering detector 31 of FIG. 12 is replaced with a tampering detector 51.

The tampering detector 51 includes a verification rule generator 511, a verification pattern extractor 512, a verification pattern comparator 513, an error detector 514, and a tampering determinator 515. The verification rule generator 511, the verification pattern extractor 512, the verification pattern comparator 513 are substantially similar to the verification rule generator 311, the verification pattern extractor 312, the verification pattern comparator 313, respectively. The error detector 514 stores therein the detection result of a verification document image. The error determinator 515 determines whether the verification document image has been tampered based on the detection result stored in the error detector 514.

Figure 21A:
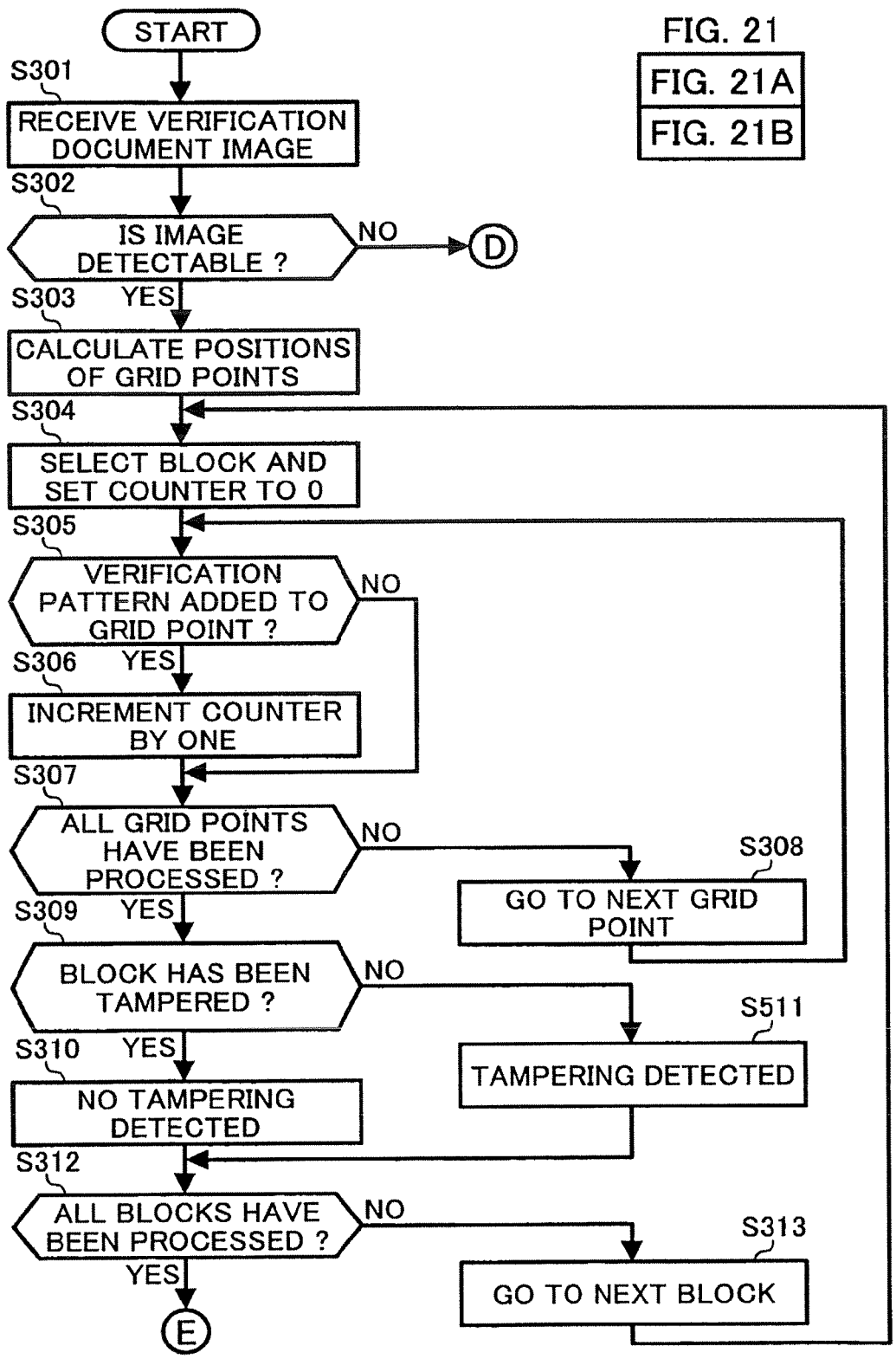
FIG. 21 a flowchart illustrating an operational process of the image processing apparatus of FIG. 20.
Figure 21B:
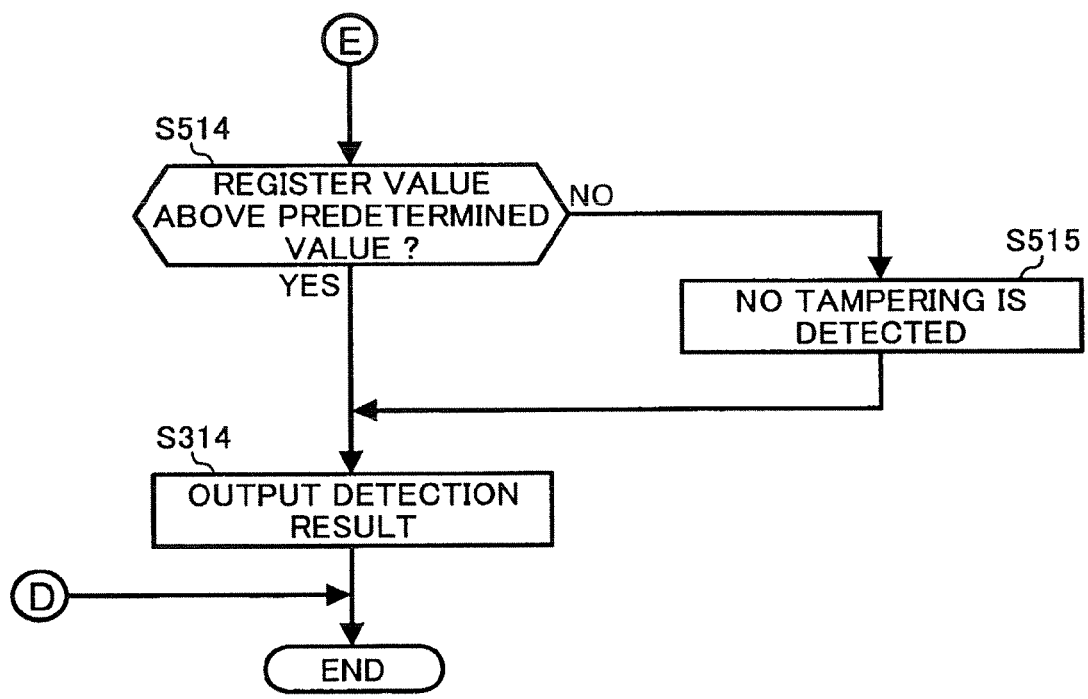

As shown in FIG. 21, the operation of the image processing apparatus 500 is substantially similar to the operation of the image processing apparatus 300 of FIG. 16, except that Step S511 replaces Step S311, and Steps S514 and S515 are additionally provided.

In Step S511, when tampering has been detected, the error detector 514 increments its register (not shown) by one. Thus, the value of the register corresponds to the number of tampered blocks detected in the image.

After Step S312 determines that all blocks have been processed, in Step S514, the tampering determinator 515 determines whether the value of the register is above a predetermined register value. If not, the operation moves to Step S515 to determine that the image has not been tampered. Otherwise, the operation moves to Step S314 to output the detection result. The predetermined register value, in this embodiment, is set to 0 or above, depending on the level of tampering protection.

In Step S514, the tampering determinator 515 may determine the level of tampering, detected by the tampering detector, based on the value of the register. For example, a high register value indicates a high level of detected tampering, while a low register value indicates a low level of detected tampering. The level of tampering may be also output in Step S314.

In any of the above-described embodiments, a mark may be provided on a printed verification document to specify a part of a verification document image having a verification pattern, thereby facilitating the tamper detection process.

Further, a verification document image may be visually checked for its validity. For example, assuming that the document image shown in FIG. 3 has been altered to the document image shown in FIG. 17, several dots (in this example, four) around the figure "4" of FIG. 17 are overlapped with a part of the figure "4". Thus, in order to keep tampering unrevealed, these overlapped dots need to be erased, which is practically impossible with today's known technologies.

Numerous additional modifications and variations are possible in light of the above teachings. It is therefore to be understood that within the scope of the appended claims, the disclosure of this patent specification may be practiced otherwise than as specifically described herein.

Figure 22:
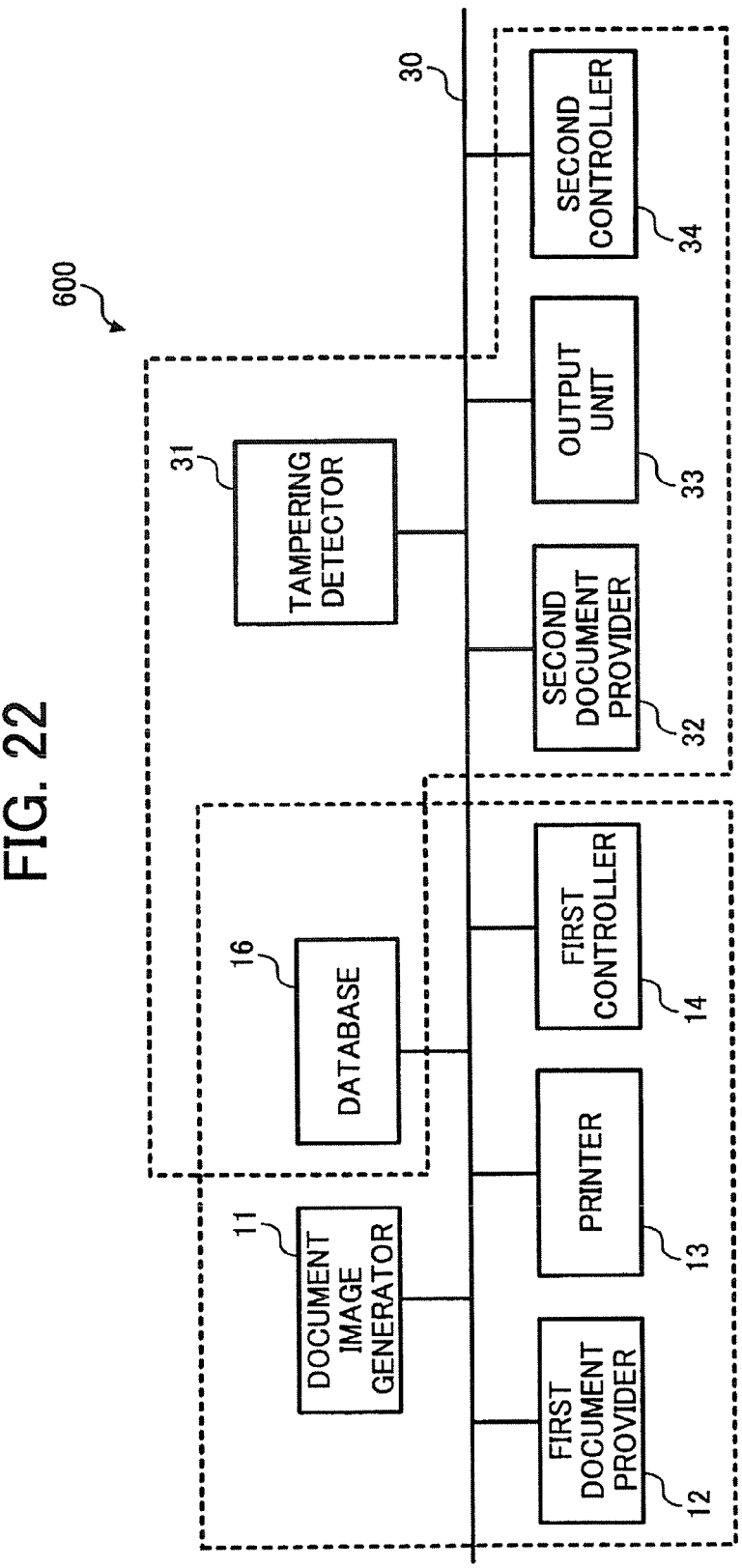
FIG. 22 is a block diagram illustrating an image processing apparatus according to another embodiment of the present invention.
Figure 23:
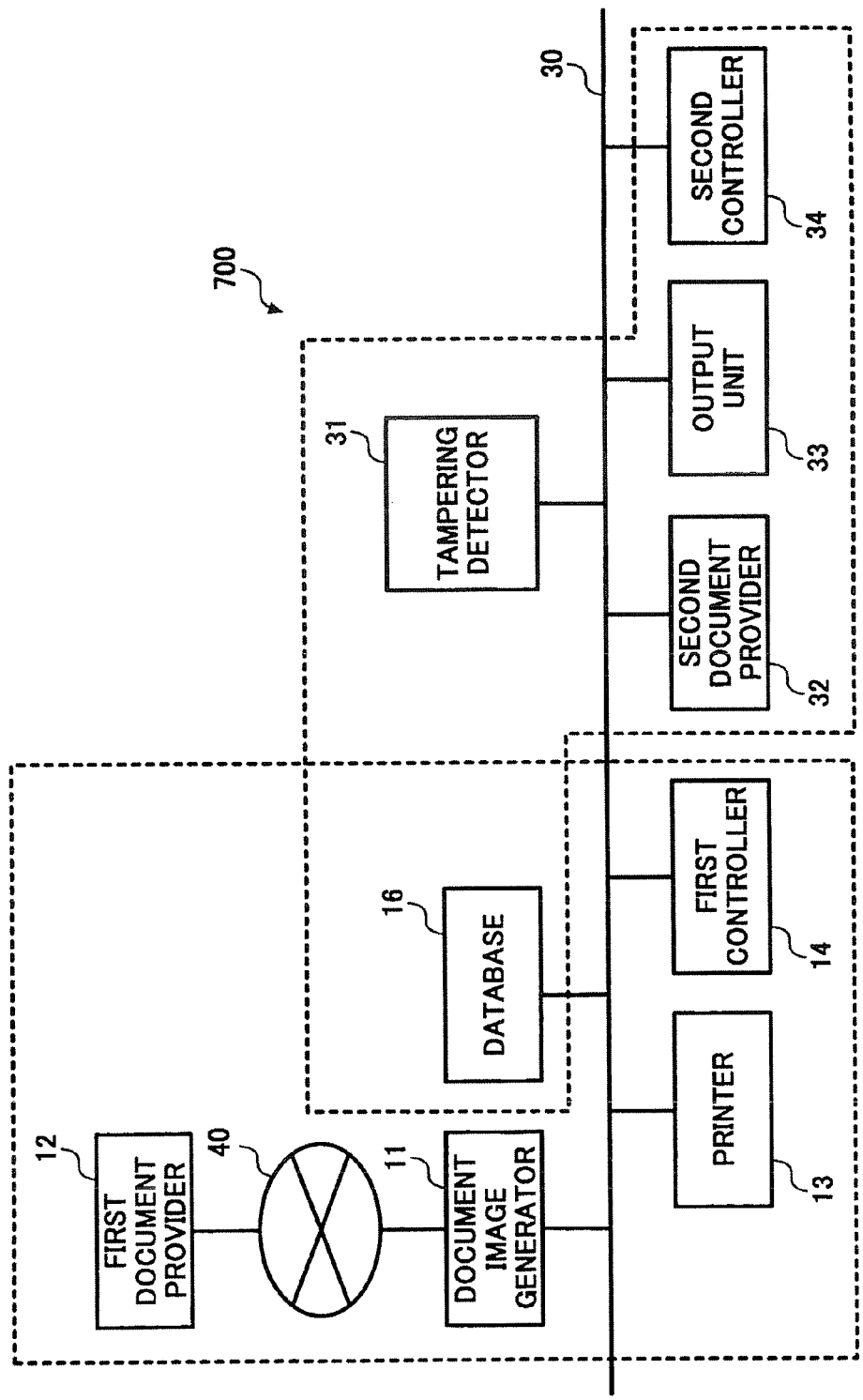
FIG. 23 is a block diagram illustrating an image processing apparatus according to another embodiment of the present invention.

For example, elements and/or features of different illustrative embodiments may be combined with each other and/or substituted for each other within the scope of this disclosure and appended claims, as illustrated in FIGS. 22 and 23. FIG. 22 illustrates an image processing apparatus 600 having functions of the image processing apparatus 100 and the image processing apparatus 300. All devices are connected via a network 30, which may be implemented as the Internet. Specifically, the image processing apparatus 600 is capable of generating a verification document image and checking validity of a verification document image. FIG. 23 illustrates an image processing apparatus 700 having a structure similar to that of the image processing apparatus 600, except that the document provider 12 is connected via another network 40 to the verification document generator 11. The network 40, which differs from the network 30, may be implemented as a public switched telephone network, for example.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

What is claimed as new and desired to be protected by Letters Patent of the United States is:

1. An image processing apparatus, comprising:
 a document image generator for performing the tasks comprising:
  generating a verification document image by adding a specific verification pattern including a plurality of verification pattern elements to a background of an original document image, by dividing a selected portion of the original document image into a plurality of equally-sized unit blocks and adding a plurality of verification pattern elements to each one of the plurality of unit blocks only to portions of the unit blocks having no document data thereon, wherein each of the plurality of predetermined verification pattern elements added to each one of the plurality of unit blocks is a unit dot pattern having a plurality of dots; and
  assigning each one of the plurality of unit blocks a value, and adjusting a number of the plurality of dots of the unit dot pattern added to each unit block using the assigned value to be an adjusted number, wherein the number of the plurality of dot patterns of the unit dot pattern added to each unit block is changed to be the adjusted number based on the assigned value of the respective unit block by deleting a single dot from or adding a single dot to the plurality of dot patterns; and
 an image processor connected to the document image generator via a network.

2. The image processing apparatus of claim 1, wherein the network includes the Internet.

3. The image processing apparatus of claim 1, further comprising:
 a database connected, via the network, to the document image generator and storing a plurality of verification patterns, wherein the specific verification pattern is selected from the plurality of verification patterns.

4. The image processing apparatus of claim 3, wherein the network includes the Internet.

5. The image processing apparatus of claim 3, further comprising a verification pattern selector that selects the specific verification pattern based on whether document data exists on a selected grid point of one of the plurality of unit blocks.

6. The image processing apparatus of claim 1, wherein the image processor comprises a document provider providing the original document image to the document image generator.

7. The image processing apparatus of claim 1, wherein the image processor comprises an image forming apparatus printing the verification document image provided from the document image generator.

8. The image processing apparatus of claim 7, wherein the image processor further comprises a controller controlling the image forming apparatus.

9. The image processing apparatus of claim 1, wherein the document image generator adds the specific verification pattern to an entire portion of the background of the original document image.

10. The image processing apparatus of claim 1, wherein the image processor further comprises a verification area designator connected, via the network, to the document image generator and designating a verification area of the original document image, and wherein the document image generator adds the specific verification pattern to the verification area of the background of the original document image.

11. The image processing apparatus of claim 1, wherein the document image generator further comprises a random number generator configured to generate a random number sequence that assigns the value to each of the unit blocks.

12. The image processing apparatus of claim 11, wherein the random values number sequence comprises 0 and 1 values.

13. A computer readable medium containing a program that causes an image processing apparatus to execute a method comprising the steps of:
 generating a verification document image by adding a specific verification pattern including a plurality of verification pattern elements to a background of an original document image, by dividing a selected portion of the original document image into a plurality of equally-sized unit blocks and adding a plurality of verification pattern elements to each one of the plurality of unit blocks only to portions of the unit blocks having no document data thereon, wherein each of the plurality of predetermined verification pattern elements added to each one of the plurality of unit blocks is a unit dot pattern having a plurality of dots; and assigning each one of the plurality of unit blocks a value, and adjusting a number of the plurality of dots of the unit dot pattern added to each unit block using the assigned value to be an adjusted number, wherein the number of the plurality of dot patterns of the unit dot pattern added to each unit block is changed to be the adjusted number based on the assigned value of the respective unit block by deleting a single dot from or adding a single dot to the plurality of dot patterns.

14. The computer readable medium of claim 13, wherein the method further comprises the step of outputting the verification document image via a network.

15. The computer readable medium of claim 13, wherein the method further comprises the step of selecting the specific verification pattern from a plurality of verification patterns stored in a database.

* * * * *

UNITED STATES PATENT AND TRADEMARK OFFICE
CERTIFICATE OF CORRECTION

PATENT NO.        : 7,590,289 B2
APPLICATION NO.   : 10/865789
DATED             : September 15, 2009
INVENTOR(S)       : Ishii et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1127 days.

Signed and Sealed this

Twenty-first Day of September, 2010

David J. Kappos
*Director of the United States Patent and Trademark Office*